US012032755B2

(12) United States Patent
 Ohanian

(10) Patent No.: US 12,032,755 B2
(45) Date of Patent: Jul. 9, 2024

(54) ADJUSTABLE SUPPORTING ASSEMBLY FOR USER OF ERGONOMIC MOUSE, AND ERGONOMIC ADJUSTABLE COMPUTER MOUSE

(71) Applicant: Ara Ohanian, Doravill, GA (US)

(72) Inventor: Ara Ohanian, Doravill, GA (US)

( * ) Notice: Subject to any disclaimer, the term of this patent is extended or adjusted under 35 U.S.C. 154(b) by 0 days.

(21) Appl. No.: 18/088,821

(22) Filed: Dec. 27, 2022

(65) Prior Publication Data

US 2023/0205327 A1 Jun. 29, 2023

Related U.S. Application Data

(60) Provisional application No. 63/294,079, filed on Dec. 28, 2021.

(51) Int. Cl.
 *G06F 3/0354* (2013.01)

(52) U.S. Cl.
 CPC .. *G06F 3/03543* (2013.01); *G06F 2203/0333* (2013.01)

(58) Field of Classification Search
 CPC .............. G06F 3/03543; G06F 2203/0333
 See application file for complete search history.

(56) References Cited

U.S. PATENT DOCUMENTS

| | | | | |
|---|---|---|---|---|
| 5,260,696 A * | 11/1993 | Maynard, Jr. ........... | G06F 3/039 | 345/157 |
| 5,581,277 A * | 12/1996 | Tajiri .................. | G06F 3/03543 | D14/417 |
| 5,913,497 A * | 6/1999 | Myers ................... | G06F 3/0202 | 248/118.5 |
| 6,396,478 B1 * | 5/2002 | Kravtin ............... | G06F 3/03543 | 248/118.1 |
| 7,675,505 B1 * | 3/2010 | Gehrking ................ | G06F 3/039 | 345/163 |
| 8,054,292 B1 * | 11/2011 | Forde .................. | G06F 3/03543 | 345/163 |
| 2002/0118174 A1 * | 8/2002 | Rodgers .............. | G06F 3/03543 | 345/163 |
| 2003/0103040 A1 * | 6/2003 | Koike ................. | G06F 3/03543 | 345/163 |
| 2005/0134565 A1 * | 6/2005 | Hong .................. | G06F 3/03543 | 345/163 |

(Continued)

*Primary Examiner* — Ariel A Balaoing
(74) *Attorney, Agent, or Firm* — Jose Cherson Weissbrot

(57) ABSTRACT

The present invention discloses an adjustable supporting assembly for a user of a conventional mouse, and an ergonomic adjustable computer mouse. The adjustable supporting assembly comprises at least one height adjustment member adapted to be coupled on a body of the conventional mouse for palm comfort. The adjustable supporting assembly also comprises at least one finger adjustment member protruding laterally from the at least one height adjustment member for finger support. The adjustable supporting assembly comprises a width adjustment member configured to extend laterally. The width adjustment member comprises a receptacle member for placing the conventional mouse, the receptacle member includes a plurality of holes for incorporating screws and a pair of adjusting plates attached to a base of the receptacle member, each of the pair of adjusting plates having a slot to incorporate a screw to be extended laterally along the slot.

20 Claims, 10 Drawing Sheets

(56) References Cited

U.S. PATENT DOCUMENTS

| | | | |
|---|---|---|---|
| 2005/0253028 A1* | 11/2005 | Kennedy | G06F 3/039 248/118 |
| 2006/0152490 A1* | 7/2006 | Ho | G06F 3/03543 345/163 |
| 2008/0143677 A1* | 6/2008 | O'Keeffe | G06F 3/03543 345/163 |
| 2010/0007607 A1* | 1/2010 | Li | G06F 3/03543 345/163 |
| 2015/0138093 A1* | 5/2015 | Young | G06F 3/0312 345/166 |
| 2015/0261324 A1* | 9/2015 | Huang | G06F 3/03543 345/163 |
| 2015/0286296 A1* | 10/2015 | Wang | G06F 3/03543 345/163 |
| 2017/0192536 A1* | 7/2017 | Wang | G06F 3/03543 |
| 2018/0011558 A1* | 1/2018 | Chao | G06F 3/03543 |
| 2019/0056805 A1* | 2/2019 | Wang | G06F 3/0362 |

* cited by examiner

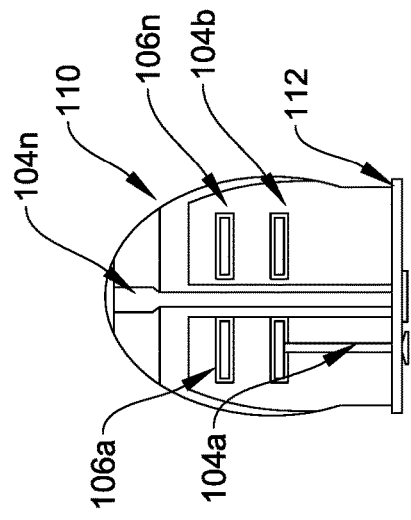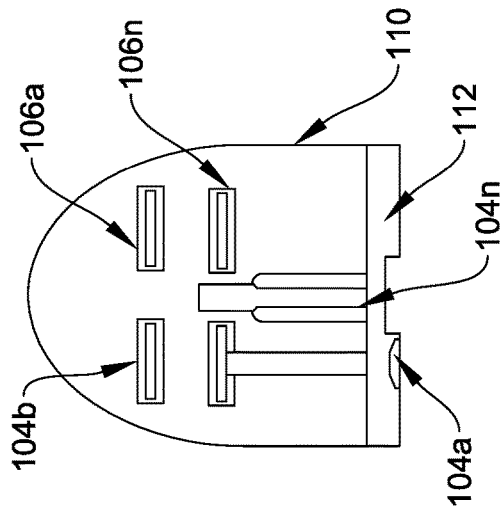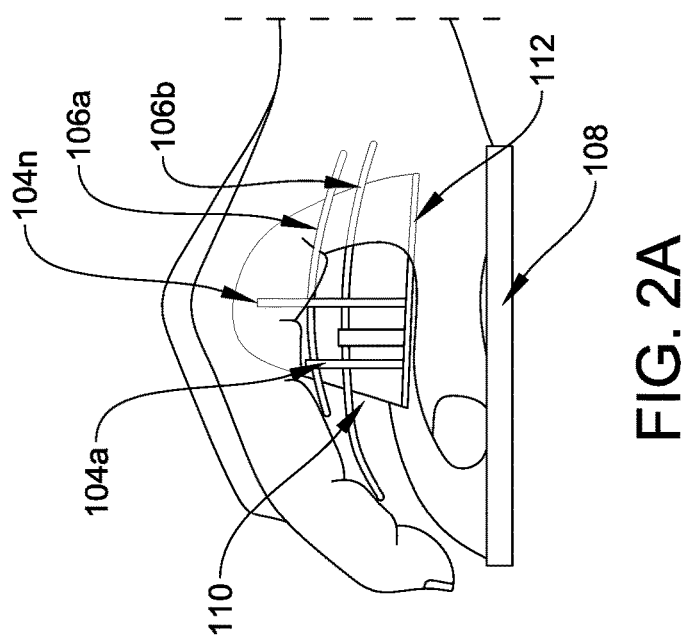

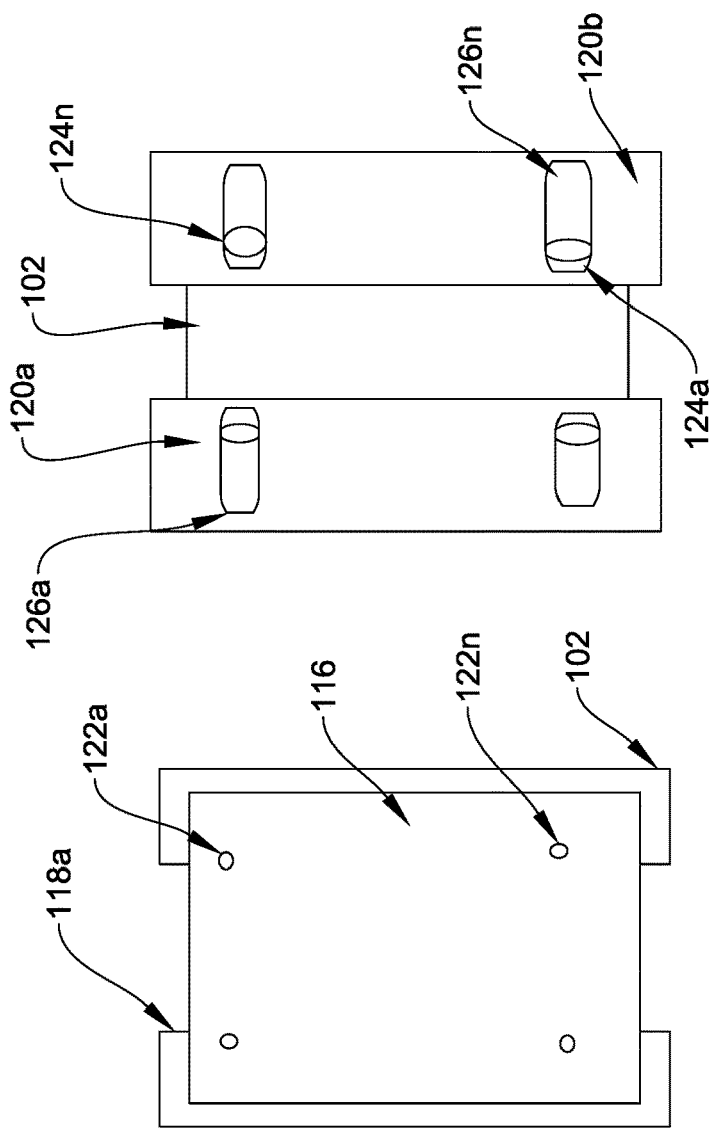

ADJUSTABLE SUPPORTING ASSEMBLY FOR USER OF ERGONOMIC MOUSE, AND ERGONOMIC ADJUSTABLE COMPUTER MOUSE

FIELD OF THE DISCLOSURE

The present invention relates generally to computer peripherals, and, more specifically, to an adjustable supporting assembly for user of an ergonomic mouse, and ergonomic adjustable computer mouse adapted for palm size placement, movement and finger operation.

BACKGROUND OF THE DISCLOSURE

A computer mouse is typically used to control the movement and functions of the cursor on a computer by sliding it along a desktop and pressing buttons. Moreover, the computer mouse may figure out how much and in which direction hand or finger may be moved for required movement. Due to the convenience of its use, the mouse is nearly three times as popular as the keyboard among modern computer users. However, long duration of uses of the mouse has also highlighted one or more chronic problems associated with the tendons, nerves, and muscles particularly (But not limited to) in the back of the hand (Fingers and back of palm), wrist (Carpal area) forearm, arm, shoulder and neck, as the computer mouse requires the user to lay his or her palm on top of it while simultaneously constantly hovering the fingers without inadvertently touching the buttons to operate it. This often results in a variety of discomfort and fatigue difficulties, particularly in the user's hand and wrist. Further, an extended use of such mouse may induce cumulative trauma disorder (CTD) or repetitive strain injuries (RSI). Further, excessive wrist motions, such as flexion and hyperextension, are also common among mouse users, resulting in inflammation in the hands and wrists. Furthermore, excessive arm and shoulder motions accompanied with the use of mouse may also cause soreness and fatigue in the arm, shoulders and neck of computer users.

The prior art contains several support devices that were implemented in connection with a computer pointing device, such as a computer mouse, to alleviate the stress and risk of damage associated with the computer mouse's frequent and repeated action. Typical support devices include stationary or moveable apparatus that support the hand, wrist, or palm.

Further, prior arts of various kind of mouse alleviates the stress and risk of damage associated with the computer mouse's frequent and repeated action. In a user's forearm and, of course, in user's shoulder, there are two sorts and categories of muscles: extensor and flexor muscles. When the user rests their palms on the desk behind the mouse, they don't use their shoulder as much, but the key is that when the user keeps the index and middle fingers lifted off the mouse's clicking buttons, they're constantly using those muscles, which causes chronic tension in those muscles, tendons, and ligaments.

In addition to the drawbacks listed above, previous art support devices are insufficient because they compel the user to concentrate all his or her hand and shoulder movement in one field of motion. Stationary palm rests limit arm and shoulder mobility, requiring the user to only move his or her wrist to manipulate the computer mouse.

Accordingly, there exists a need to overcome shortcomings of the conventional mouse. To recapitulate, the invention replaces the standard computer mouse for any transitional personal computers that require both a keyboard and a computer mouse for input tasks. When utilized in surfing-oriented tasks like viewing the Internet, the substitution is ergonomically justified.

SUMMARY OF THE DISCLOSURE

In view of the foregoing disadvantages inherent in the prior art, the general purpose of the present disclosure is to provide an adjustable supporting assembly for user of an ergonomic mouse, and ergonomic adjustable computer mouse, to include all advantages of the prior art, and to overcome the drawbacks inherent in the prior art.

An object of the present invention is to provide an adjustable supporting assembly for user of an ergonomic mouse a pre-designed hand base that makes it more comfortable for the user's hand. Further, object of the present invention discloser is to provide an adjustable supporting assembly for user of an ergonomic mouse, and ergonomic adjustable computer mouse that may improve the position in which a computer mouse is held or moved in a manner.

Embodiments in accordance with the present invention disclose an adjustable supporting assembly for a user of a conventional mouse. The adjustable supporting assembly comprising at least one height adjustment member adapted to be coupled on a body of the conventional mouse for palm comfort. The adjustable supporting assembly comprising at least one finger adjustment member protruding laterally from the at least one height adjustment member for finger support.

In one embodiment of the present disclosure, the at least one height adjustment member comprises: a base plate adapted to be coupled to a body of the conventional mouse; a dome shaped member adjustably coupled to the base plate, at least one screw member extents from the base plate and ends at the dome shaped member, wherein the at least one screw member is rotated to adjust a height of the dome shaped member on the base plate. Further, in such embodiment, the height adjustment member comprises slots in which the finger adjustment members are inserted to protrude laterally from the height adjustment member for supporting fingers of the user, and at least one another screw member extents from the base plate to an interior of the dome shaped member and end at the finger adjustment member to adjust a height of the finger adjustment member.

In one embodiment of the present disclosure, the least one height adjustment member comprises one or more adjustment components, whereby one or more adjustment components are stacked together for adjusting height for the palm comfort. Further, one or more adjustment components are removed from the stack to obtain at least one slot to incorporate the at least one finger adjustment member therein for supporting fingers.

In another embodiment of the present disclosure, the least one height adjustment member comprises one or more slots to revive the at least one finger adjustment member for supporting fingers.

In one embodiment of the present disclosure, the least one finger adjustment member is pivotally coupled to the height adjustment member.

In one embodiment of the present disclosure, the adjustable supporting assembly further comprises a width adjustment member adapted to be detachably coupled to a base of the conventional mouse and configured to extend laterally. Further, the width adjustment member comprises a receptacle member for receiving the base of the conventional mouse. The receptacle member includes a plurality of holes. The width adjustment member comprises a pair of adjusting plates attached to a base portion of the receptacle member, each of the pair of adjusting plates having a plurality of longitudinal slots. The plurality of longitudinal slot is aligned with the plurality of holes. The width adjustment member further comprises at least one screw member to be received in the aligned plurality of holes and plurality of slots to incorporate a screw to be extended laterally along the plurality of longitudinal slots and the plurality of holes.

In one embodiment of the present disclosure, the adjustable supporting assembly comprises a coupling member for sticking the adjustable supporting assembly to the conventional mouse. The coupling member may be of an elastic material.

In one embodiment of the present disclosure, the adjustable supporting assembly comprises a sheet member adapted for independent palm support to provide the appearance of a single piece of mouse body.

In one embodiment of the present disclosure, the adjustable supporting assembly comprises a knuckle supporting member mounted on the height adjustment member. Further, the knuckle supporting member having a slot to incorporate a screw to be extended laterally along the slot.

Embodiments in accordance with the present invention provides an ergonomic mouse comprising a body and a base coupled to the body. The ergonomic mouse includes at least one height adjustment member adapted to be detachably coupled to the body for palm support and comfort. The ergonomic mouse also includes at least one finger adjustment member protruding laterally from the at least one height adjustment member for finger support.

In one embodiment of the present invention, the ergonomic mouse also includes a width adjustment member detachably coupled to the base. the width adjustment member is configured to extend laterally in sidewise manner from the base.

In one embodiment of the present disclosure, the width adjustment member comprises a receptacle member for receiving the base of the ergonomic mouse, the receptacle member includes a plurality of holes. A pair of adjusting plates attached to a base portion of the receptacle member, each of the pair of adjusting plates having a plurality of longitudinal slots. The plurality of longitudinal slot is aligned with the plurality of holes.

In one embodiment of the present invention, at least one screw member to be received in the aligned plurality of holes and plurality of slots to incorporate a screw to be extended laterally along the plurality of longitudinal slot and the plurality of holes.

Embodiments in accordance with the present invention provides a two-part assembly for a user of a conventional mouse. The two-part assembly comprising a palm and finger supporting assembly and a width adjustment assembly. Further, the palm and finger supporting assembly includes at least one height adjustment member to be detachably coupled to a body of the conventional mouse for palm comfort and natural rest in neutral position simultaneously being positioned to easily use the mouse function buttons with minimal input, due to the adjustability of the hand. The term "natural rest" may be defined as a position wherein from the finger to the shoulder is limp and requiring no effort. Further, the term "neutral position" may be defined as a desired distance from fingers to buttons, approximately 1 mm to 5 mm, to click or push buttons of the mouse. Additionally, the palm and finger supporting assembly comprises at least one finger adjustment member protruding laterally from the at least one height adjustment member for finger support. The width adjustment assembly detachably coupled to a base of the conventional mouse. The width adjustment member is configured to extend laterally in sidewise manner from the base. The width adjustment member comprises a receptacle member for receiving the base of the conventional mouse and the receptacle member includes a plurality of holes. Furthermore, the width adjustment member comprises a pair of adjusting plates attached to a base portion of the receptacle member. Each of the pair of adjusting plates having a plurality of longitudinal slots. The plurality of longitudinal slot is aligned with the plurality of holes. Furthermore, at least one screw member to be received in the aligned plurality of holes and plurality of slots to incorporate a screw to be extended laterally along the plurality of longitudinal slot and the plurality of holes.

In one embodiment of the present disclosure, a knuckle supporting member is mounted on the height adjustment member. Further, the knuckle supporting member having a slot to incorporate a screw to be extended laterally along the slot.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which:

FIG. 2A illustrates a side view of the adjustable supporting assembly depicting a height adjustment member, according to one embodiment of the present invention disclosed herein;

FIGS. 2B and 2C illustrate a back view of the adjustable supporting assembly depicting the height adjustment member of FIG. 2A, wherein adjusting screws extended vertically along a slot, according to one embodiment of the present invention disclosed herein;

FIGS. 3A and 3B illustrate a back view of a width adjustment member of the adjustable supporting assembly of FIG. 2A, according to one embodiment of the present invention disclosed herein;

FIG. 3C illustrates a top view of the width adjustment member of the adjustable supporting assembly of FIG. 2A, according to one embodiment of the present invention disclosed herein;

FIG. 3D illustrates a bottom view of the width adjustment member of the adjustable supporting assembly of FIG. 2A, according to one embodiment of the present invention disclosed herein;

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides an ergonomic mouse. It should be emphasized, however, that the present disclosure is not limited only to what is disclosed and extends to cover various alternation to the ergonomic mouse. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

The present invention discloses pertains to computer peripherals specifically to a computer mouse that is ergonomically designed. It relates to pointing devices used in conjunction with a personal computer.

Referring now to FIGS. 1A to 7, various views, and components of an adjustable supporting assembly attached to a conventional mouse and will now be described in conjunction to all the FIGS. 1A to 7, in accordance with various embodiments of the present disclosure.

Figure 1A:
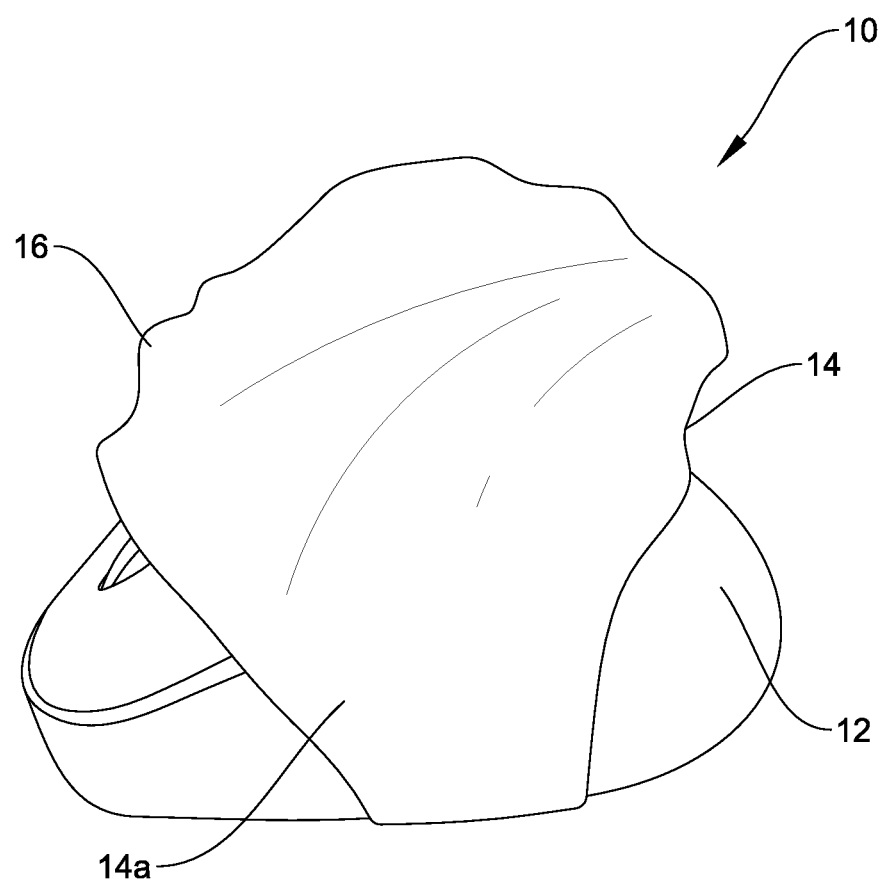
FIG. 1A illustrates a side view of an adjustable supporting assembly attached to a conventional mouse, according to one embodiment of the present invention disclosed herein.

FIG. 1A illustrates a side view of an adjustable supporting assembly 10 for a user of a conventional mouse 12, according to one embodiment of the present invention. In a simplest embodiment, the adjustable supporting assembly 10 may include at least one height adjustment member 14. Such height adjustment member 14 may be coupled to the mouse via a coupling member 14a that may be of an elastic material that may be wrapped around the conventional mouse along with the height adjustment member 14. The elastic material may include, but not limited to, fabric, rubber, any other stretchy material having suitable stretchability. Further, in such embodiment, the adjustable supporting assembly 10 may further include at least one finger adjustment member 16 coupled to the height adjustment member 14 and protrude from the height adjustment member 14. In such embodiment, the finger adjustment member 16 may be simply inserted in the height adjustment member 14 by pressing the finger adjustment member 16 against the height adjustment member 14, as the height adjustment member 14 may be made of a flexible material, such as EVA foam, and the like. Also, in such embodiment, the height adjustment member 14 made of as the EVA foam be simply cut from a front side to shape a finger to provide the support for the finger.

Figure 1B:
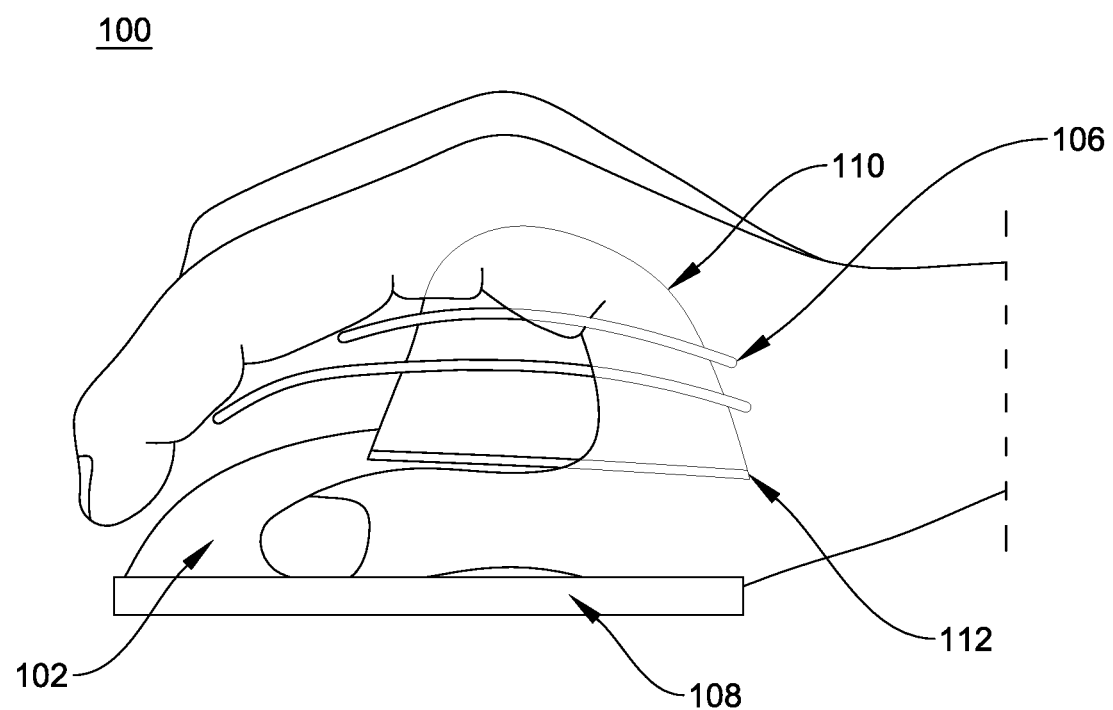
FIG. 1B illustrates a side view of an adjustable supporting assembly attached to a conventional mouse, according to further embodiment of the present invention disclosed herein.

Further, FIG. 1B illustrates a side view of an adjustable supporting assembly 100 for a user of a conventional mouse 102, according to further embodiment of the present invention. the adjustable supporting assembly 100 may include at least one height adjustment member 104, at least one finger adjustment member 106, and a width adjustment member 108. The at least one height adjustment member 104 (hereinafter also referred to as 'height adjustment member 104') and at least one finger adjustment member 106 (hereinafter also referred to as 'finger adjustment member 106') may be coupled to a body of the conventional mouse 102, wherein the height adjustment member 104 may include a dome shaped member 110 that is coupled to a base plate 112. Using the base plate 112, the height adjustment member 104 may be coupled to the body of the conventional mouse 102.

Each height adjustment member 104 may be capable of increasing or decreasing the height of the dome shaped member 110 which is attached to the base plate 112. According to embodiments of the present invention, the dome shaped member 110 may be a sheet member adapted for independent palm support to provide the appearance of a single piece of mouse body. According to an embodiment of the present invention, the sheet member may be made of a material comprising fabric, rubber, any stretchy material, and so forth. Embodiments of the present invention are intended to include or otherwise cover any type of sheet including known, related art, and/or later developed technologies.

Further, the dome shaped member 110 may be flexible in nature. In an embodiment of the present invention, the base plate 112 may also be flexible in nature to accommodate a shape as per the body of the conventional mouse 102. The base plate 112, along its bottom surface may include a means for attaching the height adjustment member 104 to the body of the conventional mouse 102. The means for attaching may include, but not limited to, sticky material, such as glue; hook and loop attachments, elastic, or the like.

In an embodiment of the present invention, the at least one height adjustment member 104 may further include one or more screws 114n that extends from the base plate 112 to an interior of the dome shaped member 110, as seen in FIGS. 2A-2C. The screw 114n may be located in the middle of the base plate 112 to extend within the interior of the dome shaped member 110 up to a maximum height of the dome shaped member 110 for adjusting height range of the dome shaped member 110.

The finger adjustment members 106a-106b may be protruding laterally from the height adjustment member 104 for supporting fingers of the user. In an embodiment, the height adjustment member 104 may include slots 104b in which the finger adjustment members 106a-106b may in inserted to protrude laterally from the height adjustment member 104 for supporting fingers of the user. The finger adjustment member 106a-106b may be adjusted in a forward direction, a backward direction, and in a side-to-side direction within the slots 104b. In further embodiments, the finger adjustment member 106a-106b may also be adjusted vertically to adjust the height thereof. In such embodiment, the height adjustment member 104 may further include one or more screws 104a that extends from the base plate 112 to the interior of the dome shaped member 110 and end at the finger adjustment member 106a-106b, as seen in FIGS. 2A-2C. The screw 104a may be screwed-in or screwed-out from the base plate 112 to adjust the height range of the finger adjustment member 106a-106b.

Referring back to FIG. 1B and FIG. 2A, the width adjustment member 108 may be adapted to be detachably coupled to a base portion of the conventional mouse 102. The width adjustment member 108 may be configured to be adjusted along a width of the convention mouse 102 for providing finger support, particularly, to thumb and pinky finger of the user, independently from either side of the conventional mouse 102.

Referring now to FIGS. 3A to 3D, in an embodiment of the present invention, the width adjustment member 108 may include a receptacle member 116 and a pair of adjusting plates 118a-118b. The receptacle member 116 adapted to receive the base of the conventional mouse 102. The receptacle member 116 and the pair of adjusting plates 118a-118b are coupled to each other such that the pair of adjusting plates 118a-118b may be adjusted laterally (sidewise) with respect to the receptacle member 116. For example, as seen in FIGS. 3C and 3D, to obtain such arrangement, the receptacle member 116 may include a plurality of holes 122a-122n. Further each plate of the pair of adjusting plates 118a-118b may be include longitudinal slots 126a-126n. The plurality of holes 122a-122n of the receptacle member 116 and the longitudinal slots 126a-126n are arranged to receive screws 124a-124n. The screws 124a-124n extend laterally along the longitudinal slots 126a-126n and the plurality of holes 122a-122n to obtain operatively engaging connection between the receptacle member 116 and the pair of adjusting plates 118a-118b. In use, the pair of adjusting plates 118a-118b may be extended laterally from the receptacle member 116 by loosening or tightening the screws 124a-124n.

Figure 4:
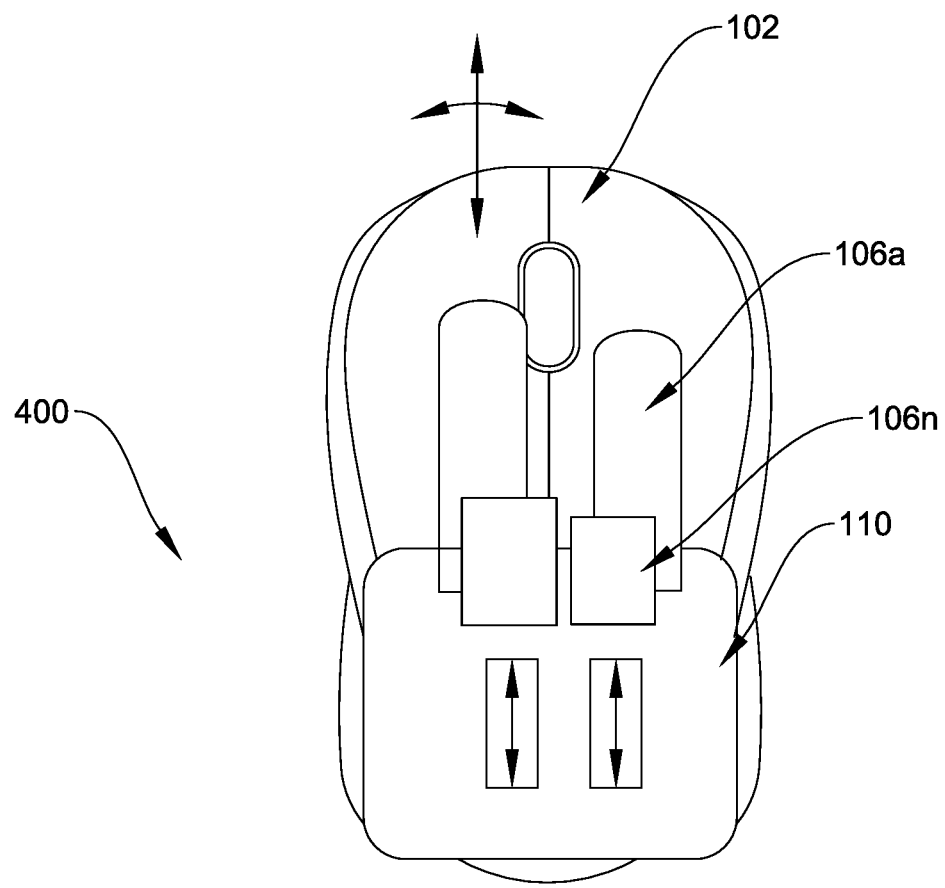
FIG. 4 illustrates a top view of the of the adjustable supporting assembly for the conventional mouse body depicting a working mechanism thereof, according to embodiments of the present invention disclosed herein.

FIG. 4 illustrates a top view of the of the adjustable supporting assembly 100 coupled to the body of the conventional mouse. As seen, the finger adjustment member 106 may be adapted to be adjusted in the forward direction, in the backward direction, and in a side-by-side direction with respect to the conventional mouse 102.

Figure 5:
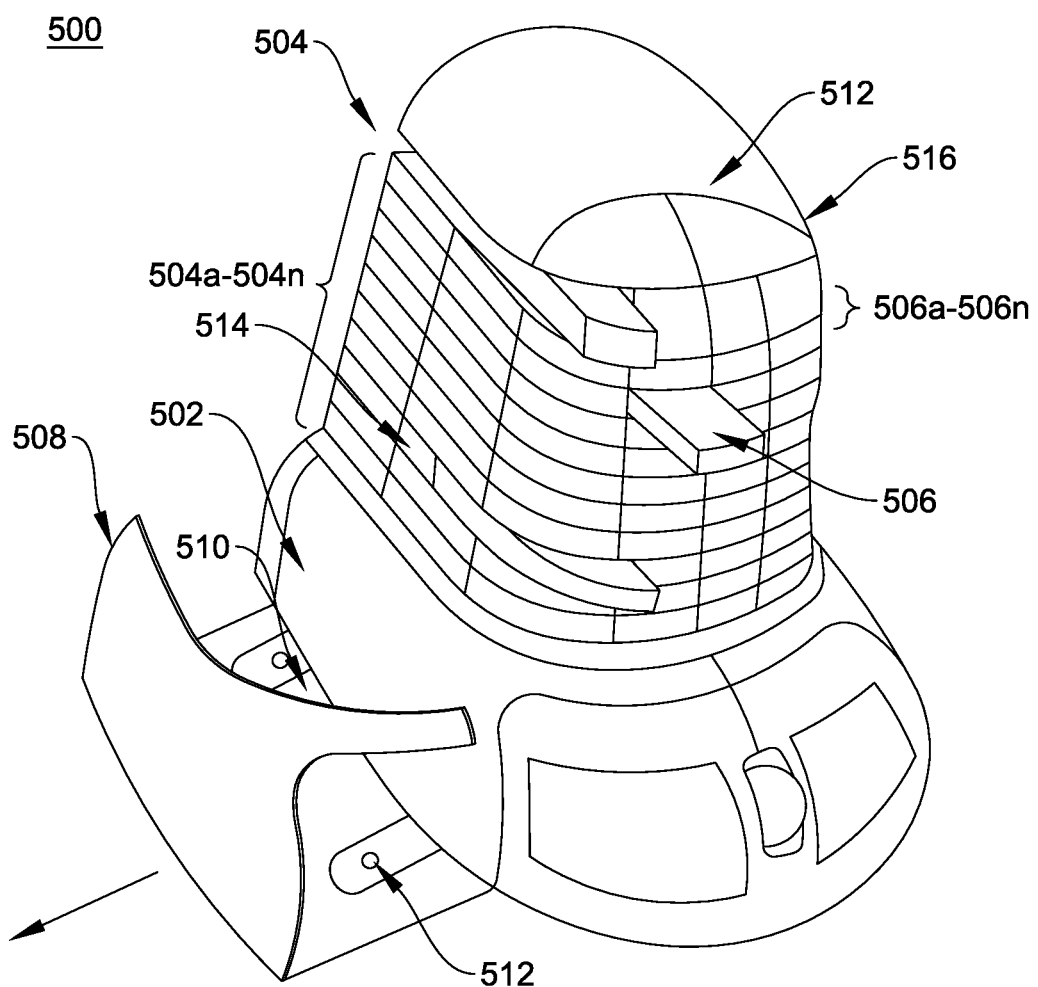
FIG. 5 illustrates a perspective view of an adjustable supporting assembly attached to a conventional mouse depicting a height adjustment member and a width adjustment member, according to another embodiment of the present invention disclosed herein.

FIG. 5 illustrates a perspective view of an adjustable supporting assembly 500 for a user of a conventional mouse 502, according to another embodiment of the present invention. The adjustable supporting assembly 500 of the present invention also includes at least one height adjustment member 504, at least one finger adjustment member 506, and a width adjustment member 508. Constructional features of the width adjustment member 508 is similar to the constructional features of the width adjustment member 108 as described in conjunction with FIGS. 3A to 3D and is avoided herein from further explanation for the sake of brevity.

As per the embodiment of the present invention as illustrated in FIGS. 5 and 6A-6C, the least one height adjustment member 504 of this embodiment may comprise one or more adjustment components 504a-504n, whereby one or more adjustment components 504a-504n may be stacked together for adjusting the height of the least one height adjustment member 504 for the palm comfort. In an example, the height adjustment member 504 may be a mushroom shaped height adjustment member.

In one embodiment, the one or more adjustment components 504a-504n may be a brick-like structure, as seen in FIG. 5, wherein each layer of height in the height adjustment member 504 may be formed by arranging multiple adjustment components 504a-504n. In such embodiment, to assemble the finger adjustment member 506 to the height adjustment member 504, any one adjustment components 504a-504n may be removed from the height adjustment member 504 to create one or more slots, in which the finger adjustment members 506 may be inserted for protruding laterally from the height adjustment member 504 for providing support to the finger.

Figure 6A:
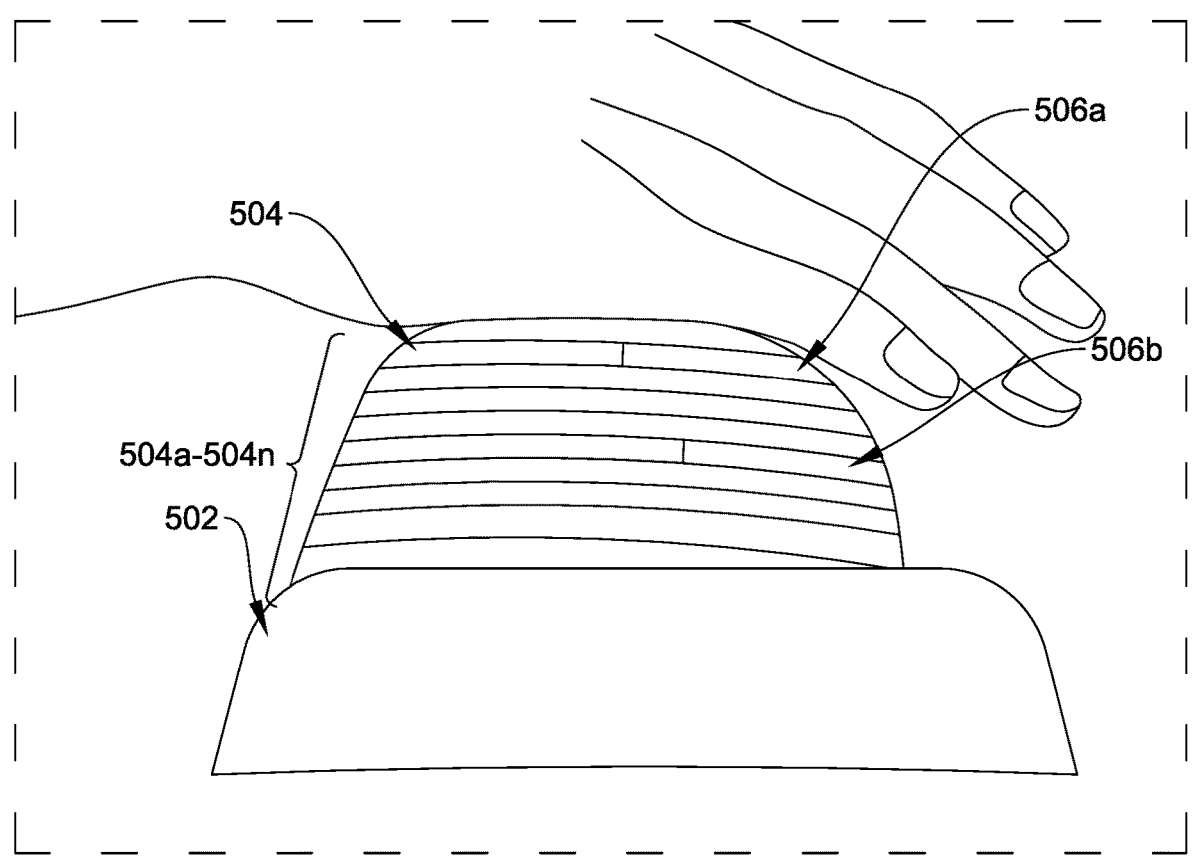
FIG. 6A illustrates an adjustable supporting assembly depicting the height adjustment member and finger adjustment members assembled over conventional mouse, according to embodiments of the present invention disclosed herein.
Figure 6B:
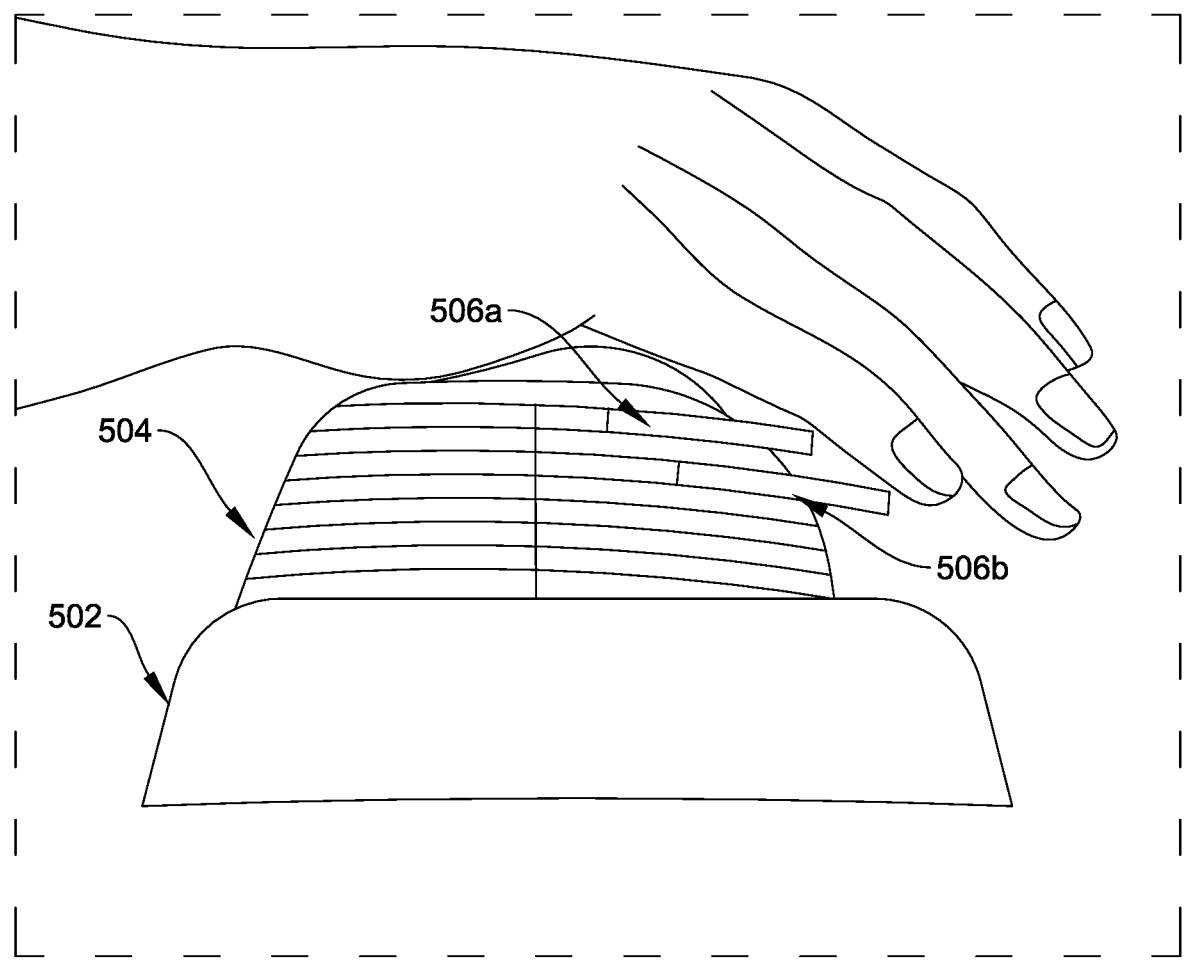
FIGS. 6B and 6C illustrate an adjustable supporting assembly depicting the height adjustment member, the finger adjustment members, and a knuckle supporting member assembled over a conventional mouse, according to embodiments of the present invention disclosed herein.

In one embodiment, the one or more adjustment components 504a-504n may be a layer-like structure, as seen in FIGS. 6A and 6B, wherein each layer of height in the height adjustment member 504 may be formed by arranging a single adjustment components 504a-504n. In such embodiment, to assemble the finger adjustment member 506 to the height adjustment member 504, any one adjustment components 504a-504n may include one or more slots, in which the finger adjustment members 506 may be inserted for protruding laterally from the height adjustment member 504 for providing support to the finger. In such embodiment, the height adjustment member 504 may be cut into a preset way and form as thick layers of EVA foam which are layered on top of each other at a specific height. A user may lay his/her hand on top of that layered specific height, thereby supporting palm and fingers.

Figure 6C:
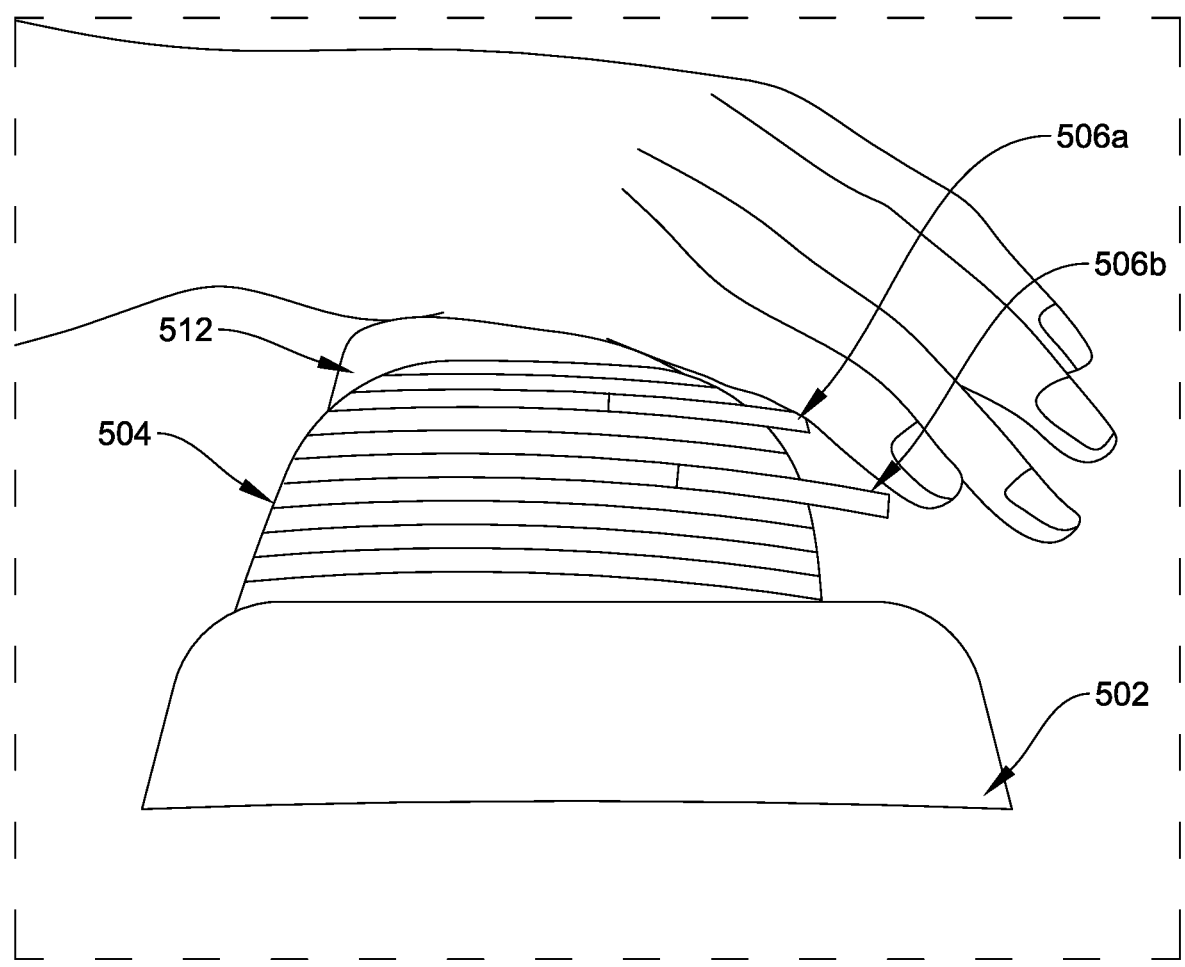

In an embodiment of the present invention, as seen in FIGS. 6B and 6C, the adjustable supporting assembly 500 (or 100) may further include a knuckle supporting member 512, which may be mounted on the height adjustment member 504. The knuckle supporting member 512 may comprise a slot to incorporate a screw to be extended laterally along the slot for being adjusted as per the user preference. As seen in FIG. 6B, the knuckle supporting member 512 is along extreme backside of the height adjustment member 504, which when required may be slid to extreme forward of the height adjustment member 504 for supporting a palm area beneath the knuckle of the user, as seen in FIG. 6C.

Figure 7:
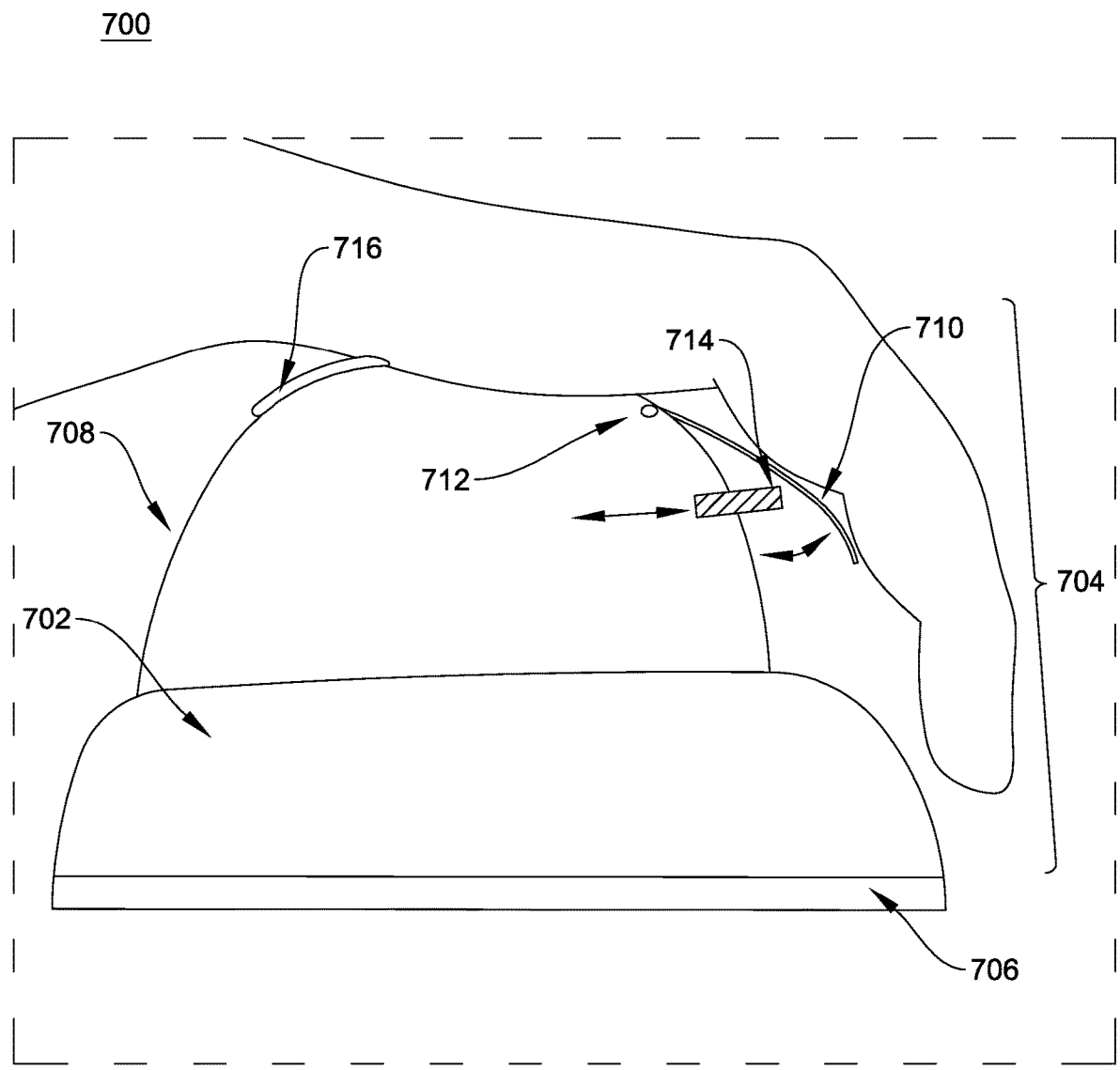
FIG. 7 illustrates a side view of an adjustable supporting assembly attached to a conventional mouse, according to further embodiment of the present invention disclosed herein.

Referring now to FIG. 7, another embodiment of an adjustable supporting assembly, such as an adjustable supporting assembly 700 is illustrated. The adjustable supporting assembly 700 may include at least one height adjustment member 708, at least one finger adjustment member 710 and a width adjustment assembly 706, as seen in FIG. 7. Constructional features of the height adjustment member 708 or the constructional features of the width adjustment member 706 may be similar to the constructional features of the height adjustment member or the constructional features of the width adjustment member, as described in conjunction with FIGS. 3A to 3D, and FIGS. 5, 6A-6B and are avoided herein from further explanation for the sake of brevity.

In the present embodiment, as seen in FIG. 7 the least one finger adjustment member 710 may be pivotally coupled to the height adjustment member 708 via a hinge 712. Further, the at least one height adjustment member 708 may be elevated and lowered, independent of the finger supports, using the one or more adjustment screws 714. The finger support member 710 may also be utilized to adjust forward and backward adjustment as well as side to side. The side to side may also be pivoted from the point of one or more adjustment screws 714. The finger support member 710 may be approximately 1 mm thick, 5 mm to 25 mm wide, and span the length of the user's fingertip to the heel of the user's palm. The finger support member 710 may be made of semi-flexible material such as, but not limiting to, plastic, rubber, and so forth. The finger support member 710 may be comfortable to touch. The adjustability may be approximately 40 mm forward and backward and 5 to 10 mm side to side at the contact point.

Further, the finger support member 710 may be for two or three fingers. When there are two fingers (Index and middle finger) each with adjustment screw 714 or other, extending forward toward the front of a convention mouse 702.

In one of the embodiments of the present invention, a two-part assembly for a user of a conventional mouse may be provided in which in one part may include a palm and finger supporting assembly having at least one height adjustment member and at least one finger adjustment member, and another part may include a width adjustment assembly. Each of these elements are explained hereinabove in various embodiments and are excluded herein from further explanation for the sake of brevity.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. An adjustable supporting assembly for a user of a conventional mouse, the adjustable supporting assembly comprising:
   at least one height adjustment member adapted to be coupled on a body of the conventional mouse for palm comfort; and
   at least one finger adjustment member protruding laterally from the at least one height adjustment member for finger support
   wherein the at least one height adjustment member comprises:
   a base plate adapted to be coupled to a body of the conventional mouse;
   a dome shaped member adjustably coupled to the base plate; and
   at least one screw member extents from the base plate and ends at the dome shaped member, wherein the at least one screw member is rotated to adjust a height of the dome shaped member on the base plate, and
   wherein:
   the height adjustment member comprises slots in which the finger adjustment members is inserted to protrude laterally from the height adjustment member for supporting fingers of the user, and
   at least one another screw member extents from the base plate to an interior of the dome shaped member and end at the finger adjustment member to adjust a height of the finger adjustment member.

2. The adjustable supporting assembly of claim 1, further comprising:
   a width adjustment member adapted to be detachably coupled to a base of the conventional mouse and configured to extend laterally, wherein the width adjustment member comprises:
   a receptacle member for receiving the base of the conventional mouse, the receptacle member includes a plurality of holes,
   a pair of adjusting plates attached to a base portion of the receptacle member, each of the pair of adjusting plates having a plurality of longitudinal slots, wherein the plurality of longitudinal slot is aligned with the plurality of holes, and
   at least one screw member to be received in the aligned plurality of holes and plurality of slots to incorporate a screw to be extended laterally along the plurality of longitudinal slots and the plurality of holes.

3. The adjustable supporting assembly of claim 1, further comprises a sheet member adapted for independent palm support to provide the appearance of a single piece of mouse body.

4. The adjustable supporting assembly of claim 1, further comprises a knuckle supporting member mounted on the height adjustment member.

5. An adjustable supporting assembly for a user of a conventional mouse, the adjustable supporting assembly comprising:
   at least one height adjustment member adapted to be coupled on a body of the conventional mouse for palm comfort; and
   at least one finger adjustment member protruding laterally from the at least one height adjustment member for finger support,
   wherein the at least one height adjustment member comprises a plurality of adjustment components, whereby the plurality of adjustment components are stacked together for adjusting height for the palm comfort, and
   wherein the plurality of adjustment components are removed from the stack to obtain at least one slot to incorporate the at least one finger adjustment member therein for supporting fingers.

6. The adjustable supporting assembly of claim 5, further comprising:
   a width adjustment member adapted to be detachably coupled to a base of the conventional mouse and configured to extend laterally, wherein the width adjustment member comprises:
   a receptacle member for receiving the base of the conventional mouse, the receptacle member includes a plurality of holes,
   a pair of adjusting plates attached to a base portion of the receptacle member, each of the pair of adjusting plates having a plurality of longitudinal slots, wherein the plurality of longitudinal slot is aligned with the plurality of holes, and
   at least one screw member to be received in the aligned plurality of holes and plurality of slots to incorporate a screw to be extended laterally along the plurality of longitudinal slots and the plurality of holes.

7. The adjustable supporting assembly of claim 5, further comprising a coupling member for sticking the at least one height adjustment member to the conventional mouse, wherein the coupling member may be of an elastic material.

8. The adjustable supporting assembly of claim 5 further comprising a sheet member adapted for independent palm support to provide the appearance of a single piece of mouse body.

9. The adjustable supporting assembly of claim 5 further comprising a knuckle supporting member mounted on the height adjustment member.

10. An ergonomic mouse comprising:
a body, and a base coupled to the body;
at least one height adjustment member adapted to be detachably coupled to the body for palm comfort; and
at least one finger adjustment member protruding laterally from the at least one height adjustment member for finger support,
wherein the at least one height adjustment member comprises:
a base plate adapted to be coupled to a body of the conventional mouse;
a dome shaped member adjustably coupled to the base plate; and
at least one screw member extents from the base plate and ends at the dome shaped member, wherein the at least one screw member is rotated to adjust a height of the dome shaped member on the base plate, and
wherein:
the height adjustment member comprises slots in which the finger adjustment members is inserted to protrude laterally from the height adjustment member for supporting fingers of the user; and
at least one another screw member extents from the base plate to an interior of the dome shaped member and end at the finger adjustment member to adjust a height of the finger adjustment member.

11. The ergonomic mouse of claim 10, further comprising: a width adjustment member detachably coupled to the base, the width adjustment member is configured to extend laterally in sidewise manner from the base.

12. The ergonomic mouse of claim 11, wherein the width adjustment member comprises:
a receptacle member for receiving the base of the ergonomic mouse, the receptacle member includes a plurality of holes,
a pair of adjusting plates attached to a base portion of the receptacle member, each of the pair of adjusting plates having a plurality of longitudinal slots, wherein the plurality of longitudinal slot is aligned with the plurality of holes, and
at least one screw member to be received in the aligned plurality of holes and plurality of slots to incorporate a screw to be extended laterally along the plurality of longitudinal slot and the plurality of holes.

13. The adjustable supporting assembly of claim 10 further comprising a sheet member adapted for independent palm support to provide the appearance of a single piece of mouse body.

14. The adjustable supporting assembly of claim 10 further comprising a knuckle supporting member mounted on the height adjustment member.

15. An ergonomic mouse comprising:
a body, and a base coupled to the body;
at least one height adjustment member adapted to be detachably coupled to the body for palm comfort; and
at least one finger adjustment member protruding laterally from the at least one height adjustment member for finger support,
wherein the at least one height adjustment member comprises a plurality of adjustment components, whereby the plurality of adjustment components are stacked together for adjusting height for the palm comfort, and
wherein the plurality of adjustment components are removed from the stack to obtain at least one slot to incorporate the at least one finger adjustment member therein for supporting fingers.

16. The ergonomic mouse of claim 15 further comprising a width adjustment member detachably coupled to the base, the width adjustment member is configured to extend laterally in sidewise manner from the base,
wherein the width adjustment member comprises:
a receptacle member for receiving the base of the ergonomic mouse, the receptacle member includes a plurality of holes,
a pair of adjusting plates attached to a base portion of the receptacle member, each of the pair of adjusting plates having a plurality of longitudinal slots, wherein the plurality of longitudinal slot is aligned with the plurality of holes, and
at least one screw member to be received in the aligned plurality of holes and plurality of slots to incorporate a screw to be extended laterally along the plurality of longitudinal slot and the plurality of holes.

17. The adjustable supporting assembly of claim 15 further comprising a sheet member adapted for independent palm support to provide the appearance of a single piece of mouse body.

18. The adjustable of claim 15, further comprising a knuckle supporting member mounted on the height adjustment member.

19. A two-part assembly for a user of a conventional mouse, the two-part assembly comprising:
a palm and finger supporting assembly having:
at least one height adjustment member adapted to be detachably coupled to a body of the conventional mouse for palm comfort, and
at least one finger adjustment member protruding laterally from the at least one height adjustment member for a finger support; and
a width adjustment member detachably coupled to a base of the conventional mouse, the width adjustment member is configured to extend laterally in sidewise manner from the base, wherein the width adjustment member comprises:
a receptacle member for receiving the base of the conventional mouse and the receptacle member includes a plurality of holes, and
a pair of adjusting plates attached to a base portion of the receptacle member, each of the pair of adjusting plates having a plurality of longitudinal slots, wherein the plurality of longitudinal slot is aligned with the plurality of holes, and
at least one screw member to be received in the aligned plurality of holes and plurality of slots to incorporate a screw to be extended laterally along the plurality of longitudinal slot and the plurality of holes.

20. The two-part assembly of claim 19, further comprises a knuckle supporting member mounted on the height adjustment member.

* * * * *